(12) United States Patent
Fukao et al.

(10) Patent No.: US 6,211,931 B1
(45) Date of Patent: Apr. 3, 2001

(54) POLYMER-DISPERSED LIQUID CRYSTAL COMPOSITION AND LIQUID CRYSTAL DISPLAY ELEMENTS USING THE COMPOSITION

(75) Inventors: Ryuzo Fukao; Yuji Yamashita; Kouji Ooae, all of Ibaraki-ken (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/238,069

(22) Filed: Jan. 27, 1999

(30) Foreign Application Priority Data

Jan. 27, 1998 (JP) .................................................. 10-027864
Nov. 11, 1998 (JP) .................................................. 10-320871

(51) Int. Cl.⁷ ........................ G02F 1/1333; G02F 1/1347
(52) U.S. Cl. .................................. 349/86; 349/89; 349/74
(58) Field of Search ............................... 349/86, 89, 74

(56) References Cited

U.S. PATENT DOCUMENTS

| | | | |
|---|---|---|---|
| 4,579,423 * | 4/1986 | Fergason | 350/334 |
| 4,693,560 * | 9/1987 | Wiley | 350/335 |
| 5,124,183 * | 6/1992 | Nakano et al. | 428/1 |
| 5,394,256 * | 2/1995 | Yamada et al. | 359/51 |
| 5,430,563 * | 7/1995 | Bouteiller et al. | 359/51 |
| 5,516,455 * | 5/1996 | Jacobine et al. | 252/299.01 |
| 5,519,519 * | 5/1996 | Nakajima et al. | 359/52 |
| 5,570,210 * | 10/1996 | Yoshida et al. | 359/51 |
| 5,734,454 * | 3/1998 | Omae et al. | 349/86 |
| 5,929,954 * | 7/1999 | Omae et al. | 349/95 |
| 5,942,157 * | 8/1999 | Sutherland et al. | 252/582 |

* cited by examiner

Primary Examiner—William L. Sikes
Assistant Examiner—Tarifur R. Chowdhury
(74) Attorney, Agent, or Firm—Birch, Stewart, Kolasch & Birch, LLP

(57) ABSTRACT

The object of the present invention is to provide a polymer-dispersed liquid crystal display element which won't cause cross-talk effects and is capable of simple matrix drive. In the polymer-dispersed liquid crystal display element of the present invention, a polymer having a dielectric constant greater than that of the liquid crystal is used, and the volumetric content of the liquid crystal is not greater than that of the polymer.

15 Claims, 1 Drawing Sheet

POLYMER-DISPERSED LIQUID CRYSTAL COMPOSITION AND LIQUID CRYSTAL DISPLAY ELEMENTS USING THE COMPOSITION

BACKGROUND OF THE INVENTION

The present invention relates to a liquid crystal display element. More particularly, it relates to a polymer-dispersed liquid crystal display element having a novel composition.

The liquid crystal display elements currently used widely for display of information have many advantageous features such as low driving voltage, quick response and small thickness, but these elements, because of utilizing the polarizer film, had the drawback that they were poor in visual recognizability of their displays at a dark place.

In order to overcome this problem, the liquid crystal display elements of the so-called backlight system—a system having a light source on the back side of the display element—have prevailed recently. This backlight system, however, involves the problem of increased power consumption and is also still unsatisfactory in use under direct sunlight.

In search of a system which is capable of solving the above problem, enthusiastic studies have been made on the polymer-dispersed liquid crystal, as for instance proposed in JP-A 60-252687. The polymer-dispersed liquid crystal display devices, as compared with the devices utilizing polarized light which are most popularly used at present, have advantages in brightness, contrast, viewing angle, etc., and are also simple in structure since no polarizer is required, so that this type of liquid crystal display device is expected to not only supersede the currently used liquid crystal display devices but also find its way into a wider range of use.

Polymer-dispersed liquid crystal has a structure in which the liquid crystal phase is dispersed heterogeneously in the matrix polymer. The polymer-dispersed liquid crystal display devices which are under research at present can be roughly divided into the following two structural types: nematic curvilinear aligned phase (NCAP) structure in which the fine particles of liquid crystal are dispersed in the polymer matrix, and polymer network-liquid crystal display (PN-LCD) structure in which the particles of liquid crystal are dispersed in a spongy polymer. In the polymer-dispersed liquid crystal display devices, display is made by a change in strength of light scattering with the polymer due to liquid crystal alignment induced by refractive anisotropy of the liquid crystal molecules.

The nematic liquid crystal used in display devices differs in dielectric constant between the major-axial direction of the molecule and the direction orthogonal thereto, so that it shows birefrigence with different refractive indices for linearly polarized light against the wave fronts in the respective directions. The refractive index for polarized light in the major-axial direction is called extraordinary light refractive index ($n_e$) and the other refractive index is called ordinary light refractive index ($n_O$). In liquid crystal for display, usually $n_e > n_O$ and $n_e - n_O = 0.1$ to $0.3$. For the twisted nematic (TN) liquid crystal currently used for display, there are used the substrates whose surface has been pretreated for giving a twist to the liquid crystal layer, and the change of birefrigence corresponding to the change of liquid crystal alignment is effected by a pair of polarizers holding a cell therebetween. In the polymer-dispersed liquid crystal, on the other hand, the refractive index of the polymer matrix $n_S$ is equalized with ordinary light refractive index $n_O$ of the liquid crystal, and display is made by making use of the change of refractive index induced by liquid crystal alingment.

The polymer-dispersed liquid crystal has the advantages over the conventional TN liquid crystal in that it gives stronger external light as the display element changes from a light scattered state to a transparent state according to the strength of the electric field; that the viewing angle is wider because of utilization of scattering of light; and that the utilization efficiency is higher and brighter display can be obtained since no polarizer is required. It is to be further noted that use of the conventional TN liquid crystal has been limited to the devices with a relatively small display area, such as timepieces, electric calculators, etc., while the polymer-dispersed liquid crystal can be applied to the devices with a large display area, such as large-area screens, optical pulp, billboards, etc.

Since the display principle of this type of display element relies on a transmission/scattering mode based on the difference in refractive index between the polymer and the liquid crystal, this display element has the characteristics that the change of display with voltage is gentle and has no definite threshold value. Therefore, the matrix type display elements tend to cause cross-talk effects (lighting of the non-selected pixels by the leakage electric field), and have the problem that the generally used simple matrix drive is substantially infeasible, which has greatly restricted the scope of application of this type of display element.

This can be accounted for by the facts that voltage application to the liquid crystal is not necessarily performed uniformly because the ratio of liquid crystal to polymer is as high as 4~5 by weight, and that by-pass voltage tends to be applied to the peripheral pixels since a path through the liquid crystal is formed between the respective pixels.

The above phenomenon can be mitigated by increasing the polymer ratio. Usually, however, since the dielectric constant of the polymer is lower than that of the liquid crystal, the drive voltage elevates and the electric field tends to be concentrated at the polymer section, making it less likely to cause a sharp change of alignment of the liquid crystal molecules, with a resultant reduction of responsiveness.

The polymer-dispersed liquid crystal elements, although capable of bright display, also have the problem that the light scattering strength is insufficient when no electric field is applied. Light scattering strength can be increased by enlarging the film thickness, but this measure has the adverse effect of raising the drive voltage as well. As a technique for improving these properties, JP-A 7-261159 discloses a polymer-dispersed liquid crystal display featuring disposition of the transparent opposite electrodes (intermediate electrodes) between the polymer/liquid crystal composite layers. Also, JP-A 4-304421 discloses a liquid crystal display element which is capable of displaying neutral tints by combining a pair of polymer-dispersed liquid crystal films and driving them with the respective patterned transparent electrodes.

In the case of the conventional polymer-dispersed liquid crystal, however, since the ratio of liquid crystal to polymer is as high as 4~5 by weight as mentioned above, handling of the polymer/liquid crystal mixed solution is difficult especially when the said composite structure is used, and further since the polymer/liquid crystal composite films assume a liquid state, adhesion of the polymer/liquid crystal composite films to the substrates is unsatisfactory and a great deal of time and labor is required for the controlling operations in the production process, such as control of film thickness and control of disposition of the electrodes, which leads to an increase of manufacturing cost. Moreover, in the case when an ultraviolet-curing resin is used for the polymer, since generally polymer adhesion to the substrates is not good, it is necessary to closely seal the entirety of the liquid crystal cell.

Accordingly, an object of the present invention is to provide a polymer-dispersed liquid crystal display element which is capable of simple matrix drive without causing cross-talk effects.

Another object of the present invention is to provide a polymer-dispersed liquid crystal display element which is improved in contrast with no need of elevating driving voltage and also easy to manufacture.

SUMMARY OF THE INVENTION

The above problems can be solved by providing a polymer-dispersed liquid crystal composition in which the volumetric content of liquid crystal is made less than the volumetric content of polymer. Preferably, the polymer content is selected to be within the range of 50 to 90 vol %, more preferably 70 to 95 vol %, most preferably 85 vol %, and the liquid crystal content is selected to be within the range of 50 to 1 vol %, more preferably 30 to 5 vol %, most preferably 15 vol %.

The problems can also be solved by providing a polymer-dispersed liquid crystal display element comprising a first transparent or opaque substrate having on one side thereof a first transparent or opaque electroconductive film, a second transparent substrate having a second transparent electroconductive film on one side and a third transparent electroconductive film on the other side, and a third transparent substrate having on one side thereof a fourth transparent electroconductive film, wherein a first polymer-dispersed liquid crystal layer is disposed between the said first and second transparent electroconductive films, and a second polymer-dispersed liquid crystal layer is disposed between the said third and fourth transparent electroconductive films, and wherein the said first and fourth transparent electroconductive films constitute one of the electrodes X or Y and the said second and third transparent electroconductive films constitute the other electrode Y or X, each of said polymer-dispersed liquid crystal layers being formed from a polymer-dispersed liquid crystal composition in which the volumetric content of the liquid crystal is not greater than the volumetric content of the polymer.

DESCRIPTION OF REFERENCE NUMERALS

Figure 1:
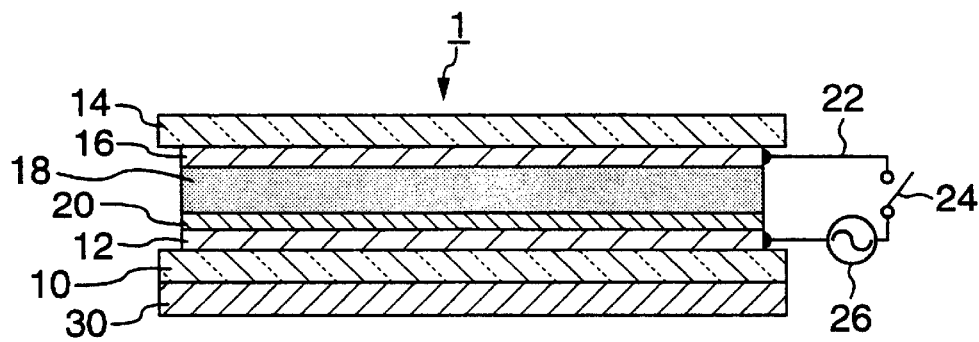
FIG. 1 is a schematic sectional view of an example of the single layer type polymer-dispersed liquid crystal display element using as its liquid crystal layer material a polymer-dispersed liquid crystal composition according to the present invention.

1: single layer type polymer-dispersed liquid crystal display element
2: laminate type polymer-dispersed liquid crystal display element
10: first substrate
12: first electroconductive film
14: second substrate
16: second electroconductive film
18: first polymer-dispersed liquid crystal layer
20: first single-film polymer layer
22: external wiring
24: on-off switch
26: AC power source
30: reflector
32: third electroconductive film
34: third substrate
36: fourth electroconductive film
38: second polymer-dispersed liquid crystal layer
40: second single-film polymer layer
42: external wiring
44: external wiring

DETAILED DESCRIPTION OF THE INVENTION

The polymer-dispersed liquid crystal composition according to the present invention is preferably used for the matrix type liquid crystal display elements, but the composition can also be applied to other types of liquid crystal display elements. Use of the composition of the present invention for the liquid crystal display elements other than the matrix type can not only better production qualifications but also reduce manufacturing cost. Liquid crystal is far higher than polymer in price per unit volume. It is, therefore, possible to reduce the manufacturing cost of the elements by restraining the amount of liquid crystal in the composition. Also, increase of the amount of polymer in the composition serves for making the composition viscous as a whole, which facilitates coating on the substrates and improves production qualifications. Further, in the case of the conventional polymer-dispersed liquid crystal displays, because of the high proportion of liquid crystal and the almost liquid state of the coat, strict sealing was necessary for maintaining the shape of the element, but the display element according to the present invention has the advantage of not requiring strict sealing because the coat is substantially solid, and form stability is remarkably improved.

In the polymer-dispersed liquid crystal compositions, however, when the ratio of liquid crystal to polymer in the composition is lowered, the problem arises that the electric field is concentrated on the polymer to impede normal drive of the display element or the drive voltage for the whole display element must be raised. It has thus been impossible in the prior art to reduce the amount of liquid crystal in the composition. The present inventor found that this problem can be solved by using a polymer having a greater dielectric constant than the liquid crystal used in the polymer-dispersed liquid crystal compositions.

Dielectric constant of the liquid crystal used in the polymer-dispersed liquid crystal composition according to the present invention is not specified. Since permittivity (relative dielectric constant) ∈r of nematic liquid crystal is usually on the order of 5 to 10, it is suggested to select and use a polymer having a dielectric constant above this order. Dielectric constant of the polymer used in the polymer-dispersed liquid crystal composition of the present invention, though not specified, is usually not greater than 20, preferably about 10 to 15. The greater the difference between dielectric constant of liquid crystal and that of polymer, the more desirable. A large difference in dielectric constant contributes to elevating the preventive action against drop of the field effect to allow concentrated application of the field effect on the liquid crystal and also makes it possible to avoid rise of drive voltage of the element.

The polymers usable for the polymer-dispersed liquid crystal composition according to the present invention include, for example, cyanoethylated compounds such as cyanoethylated cellulose with $\epsilon r \approx 10$ to 15, cyanoethylated pullulan and cyanoethylated saccharose, and polyvinylidene fluoride with $\epsilon r \approx 15$. It is possible to use other polymers which meet the above requirement of dielectric constant, such as polyvinyl butyral, polyesters, polyurethane, acrylic resins, acrylic silicone resins, epoxy resins, polyvinyl chloride, vinyl chloride/vinyl acetate copolymer, acrylic urethanes, and mixtures of these polymers. However, in order to improve transparency when an electric field is applied to the liquid crystal display element, it is desirable to make a selection such that the refractive index of the polymer and the ordinary light refractive index of the liquid crystal will agree with each other or be close to each other.

The liquid crystal used in the polymer-dispersed liquid crystal composition of the present invention is per se not specified; it is possible to use all types of liquid crystals used in the art for the described purpose, which include, for instance, nematic liquid, smectic liquid crystals, cholesteric liquid crystals, and p-type or n-type liquid crystals (as divided according to dielectric anisotropy). Dielectric constants of these types of liquid crystal are all known to the persons skilled in the art, and anyone who wants to know them can easily learn by referring to appropriate literature.

The polymer-dispersed liquid crystal composition of the present invention may contain, besides the said liquid crystal and polymer, a dichroic dye of the type used in the art. Azo dyes and anthraquinone dyes are the typical examples of the dichroic dyes usable in the composition of the present invention. A composition of the so-called guest-host (GH) mode obtained by adding a dichroic dye to liquid crystal is effective for obtaining a high display contrast. "Dichroic dye" means a dye which has the nature that its absorptivity coefficient differs greatly between the direction parallel to the major axis of the molecule and the direction orthogonal thereto. When a dichroic dye having a bar-like structure is used, since the dye molecules have a disposition to align parallel to the liquid crystal molecules, a change of alignment of the liquid crystal molecules by application of an electric field causes a corresponding change in the direction of alignment of the dye molecules. Since this dye may or may not develop color depending on the direction, it is possible to switch between tinting and non-tinting of the cells by applying a voltage.

In the polymer-dispersed liquid crystal composition of the present invention, it is desirable that the three components, i.e. polymer, liquid crystal and dichroic dye (optionally used), be dispersed together as homogeneously as possible. For this purpose, it is recommended to use a solvent capable of dissolving all of these components. This solvent is preferably lipophilic. The solvent used for dissolving the liquid crystal, the solvent used for dissolving the polymer and the solvent used for dissolving the dichroic dye may be the same or different from each other, but it is desirable that they are compatible or miscible with each other when the respective solutions are mixed together. It is advised to avoid use of a solvent which may not be mixed well and may cause phase separation when the respective solutions are mixed together. The solvents usable in the present invention include aliphatic, aromatic, alicyclic and heterocyclic compounds, typical examples thereof being cellosolve, toluene, xylene, cyclohexanone, acetone, methyl ethyl ketone, methyl isobutyl ketone, ethyl acetate, carbon tetrachloride, acetonitrile, pyridine, N,N-dimethylformamide ketone and the like. These solvents may be used either singly or as a mixture of two or more of them.

The amount of the solvent to be used is not restricted within a specified range; the solvent can be used in an amount sufficient to dissolve the liquid crystal, polymer and dichroic dye used for the polymer-dispersed liquid crystal composition of the present invention. Use of an unnecessarily large amount of solvent, even though expedient for dissolving the liquid crystal, polymer and dichoric dye, is undesirable as it necessitates a long time for the drying step after substrate coating, and also the residual solvent may cause abnormal discharge or nonuniform display. In fact, the amount of the solvent to be used is variable depending on the various factors such as solubility of the selected liquid crystal, polymer and dichroic dye in the solvent used, coating workability of the mixed solution, coat drying time, etc. Therefore, the amount of the solvent to be used can be properly decided by a skilled person in the art by taking into account such factors.

When dissolving the liquid crystal, polymer and dichroic dye in the solvent, it is possible to employ the commonly used mixing means such as stirring and heating. The three components may be dissolved at one time in a solvent or may be dissolved individually in the different solvents. The commonly used mixing means such as stirring and heating may also be applied when mixing the solutions obtained by dissolving the three components in the different solvents. A commonly used mixer such as homogenizer can be employed for stirring.

The substrates for the liquid crystal display element using the polymer-dispersed liquid crystal composition according to the present invention are not specified; it is possible to use any of the transparent and opaque substrates which have been used in the conventional liquid crystal display elements. A transparent substrate is used on the visually observed side of the liquid crystal display element. The substrate used on the non-observed side of the display element may be either transparent or opaque. The substrates may be made of, for instance, glass or plastic material. In the present invention, it is preferred to use the transparent or opaque plastic substrates. The plastic substrates, as compared with the glass ones, are low in cost and capable of being molded into a curved shape because of their flexibility, and also have better wettability than the glass substrates. The plastic materials usable for the substrates in the present invention include polyethylene terephthalate, polyethylene naphthalate, polyether sulfone and the like. It is desirable that these plastic substrates can withstand the temperature applied when forming the indium-tin oxide (ITO) transparent electroconductive films for the electrodes on the substrates and also have a certain degree of mechanical rigidity. The ITO films can be formed on the plastic substrates by a commonly used vapor deposition method such as sputtering or ion plating. The electroconductive film for electrode coated on the inside of the transparent substrate on the visually observed side of the liquid crystal display device must be transparent, but the electroconductive film for electrode coated on the inside of the transparent or opaque substrate on the non-observed side of the liquid crystal display device may be either transparent or opaque.

The substrate coating method with a polymer-dispersed liquid crystal composition solution prepared by mixing the solutions of liquid crystal, polymer and dichroic dye is not specified; various known coating methods such as doctor blade coating, screen printing, roll coating, brush coating, dip brazing and spraying can be employed.

After coating the substrates with the mixed solution, the coat is dried to remove the solvent in the usual way. Drying can be easily accomplished by conventional means such as air drying at normal temperature, hot-air drying, microwave drying, electric heat drying, etc. It is desirable to conduct perfect drying so that no solvent will be allowed to remain in the liquid crystal layers. Residual solvent in the liquid crystal layer is causative of abnormal discharge and non-uniform display.

FIG. 1 is a schematic sectional illustration of an example of polymer-dispersed liquid crystal display element using the polymer-dispersed liquid crystal composition of the present invention as the liquid crystal layer constituent. One side of a first transparent or opaque substrate 10 is coated with a first transparent or opaque electroconductive film 12, and one side of a second transparent substrate 14 is coated with a second transparent electroconductive film 16. A polymer-dispersed liquid crystal layer 18 is sandwiched between the first and second transparent electroconductive films 12 and 16. The post-dried thickness of the polymer-dispersed liquid crystal layer 18 is not specifically defined, but it is preferably in the range of 10 to 20 $\mu$m.

When disposing the polymer-dispersed liquid crystal layer 18 between the first and second electroconductive films 12 and 16, preferably a polymer solution alone is coated thinly on the upper side of the first electroconductive film 12 to form a polymer monolayer so that it is interposed between the polymer-dispersed liquid crystal layer 18 and the first electroconductive film 12. This can drastically improve adhesion of the polymer-dispersed liquid crystal layer 18 to the first electroconductive film 12. Needless to say, the polymer monolayer 20 is a transparent film.

The same polymer used for dispersing the liquid crystal or other polymers may be properly selected and used for forming the polymer monolayer 20. Accordingly, the solvent used for dissolving the polymer may be the same as used for preparing the polymer-dispersed liquid crystal composition or may be properly selected from other types of solvent. Preferably, the same polymer and solvent as used for preparing the polymer-dispersed liquid crystal composition are used for forming the polymer monolayer 20.

Since the polymer monolayer 20 is a thin film with highly dielectric nature, rise of drive voltage is substantially negligible. When no polymer monolayer 20 is used, the polymer-dispersed liquid crystal layer 18 can not be attached to the first electroconductive film 12 with sufficient adhesive force even if the substrate 10 having the first electroconductive film 12 is heat bonded to the polymer-dispersed liquid crystal layer 18, because of the difference in wettability between the surface of the first electroconductive film 12 and the surface of the polymer-dispersed liquid crystal layer 18. Such insufficient adhesion may allow intrusion of air bubbles into the spaces between the polymer-dispersed liquid crystal layer 18 and the first electroconductive film 12 to cause surface blemish. The post-dried thickness of the polymer monolayer is not restricted, but it is preferably in the range of 1 to 3 $\mu$m.

The first transparent or opaque electroconductive film 12 constitutes one of the electrodes (X electrode or Y electrode), and the second transparent electroconductive film 16 constitutes the other electrode (Y electrode or X electrode). The first and second electroconductive films 12 and 16 are connected by external wiring 22. A switch 24 and an AC power source 26 are provided midway along the line. When the switch 24 is turned on to apply a voltage to the X electrode 12 and the Y electrode 16 from the AC power source 26, the liquid crystal is mostly aligned in the direction vertical to the electrode-constituting electroconductive film surface. When the switch 24 is off (i.e. when no voltage is applied to the electroconductive film surface), the liquid crystal is mostly aligned in the direction non-vertical to the electroconductive film surface.

The polymer-dispersed liquid crystal display element 1 shown in FIG. 1 can be used either as a reflection type or as a transmission type display element. In case it is used as a reflection type display element, it is preferable to use an opaque substrate as the first substrate 10. In this case, a reflector 30 is bonded to the other side of the first transparent substrate 10 as shown in FIG. 1. The reflector material suited for the above purpose is well known to the persons skilled in the art. In case the polymer-dispersed liquid crystal display element 1 is used as a transmission type display element, a light source (not shown) is disposed at the rear of the display element 1.

Figure 2:
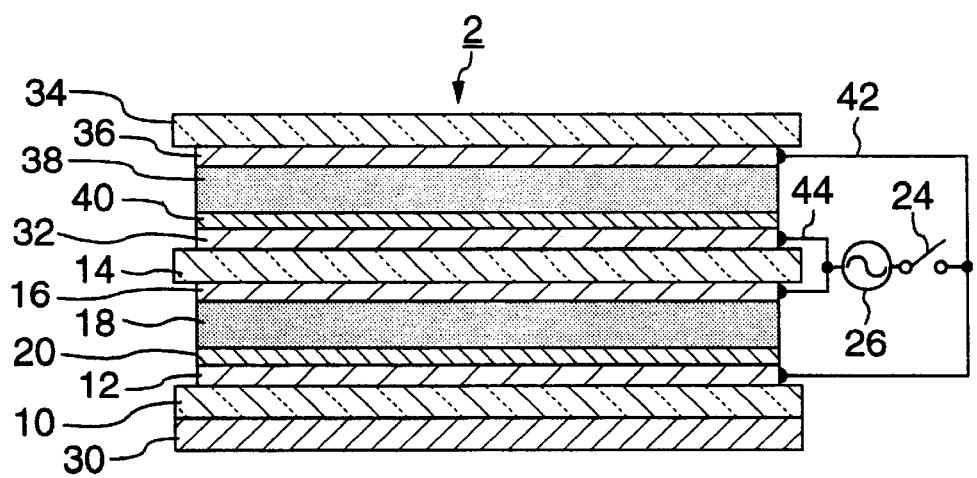
FIG. 2 is a schematic sectional view of a laminate type polymer-dispersed liquid crystal display element using as its liquid crystal layer material a polymer-dispersed liquid crystal composition according to the present invention.

FIG. 2 is a schematic sectional illustration of a laminate type polymer-dispersed liquid crystal display element using the polymer-dispersed liquid crystal composition of the present invention as the liquid crystal layer constituent. The polymer-dispersed liquid crystal layer is not restricted to the two-layer laminate structure shown in the drawing; it may be of three or more layered laminate structure. This laminate type polymer-dispersed liquid crystal display element 2 is identical with the element 1 shown in FIG. 1 in the basic structure. In the following description, therefore, the same structural members are affixed the same reference numerals and no redundant explanation is given. Incidentally, the polymer-dispersed liquid crystal layer 18 in FIG. 1 is called "first polymer-dispersed liquid crystal layer 18" in the laminate type polymer-dispersed liquid crystal display element 2 shown in FIG. 2, and the polymer monolayer 20 in FIG. 1 is called "first polymer monolayer 20" in the laminate type display element of FIG. 2.

In the polymer-dispersed liquid crystal display element shown in FIG. 2, a third transparent electroconductive film 32 is coated on the other side of the second transparent substrate 14, and a fourth transparent electroconductive film 36 is formed on one side of the third transparent substrate 34, with a second polymer-dispersed liquid crystal layer 38 being interposed between the third and fourth transparent electroconductive films 32 and 36. Preferably a second polymer monolayer 40 is provided on the upper side of the third transparent electroconductive film 32 to enhance adhesion between the third transparent electroconductive film 32 and the second polymer-dispersed liquid crystal layer 38. The post-dried thickness of the second polymer-dispersed liquid crystal layer 38 is not specified in the present invention, but, for instance, 1 to 3 $\mu$m may be mentioned as a preferred range of thickness.

In the polymer-dispersed liquid crystal display element shown in FIG. 2, the first transparent or opaque electroconductive film 12 and the fourth transparent electroconductive film 36 constitute one of the electrodes X or Y, and the second transparent electroconductive film 16 and the third transparent electroconductive film 32 constitute the other electrode Y or X. The first transparent or opaque electroconductive film 12 and the fourth traqnsparent electroconductive film 36 are connected by the first external wiring 42, and the second transparent electroconductive film 16 and the third transparent electroconductive film 32 are connected by the second external wiring 44. The first external wiring 42 and the second external wiring 44 are connected to a common AC power source 26 via an on-off switch 24. Thus, when the switch 24 is turned on, a same voltage is applied to the first polymer-dispersed liquid crystal layer 18 and the second polymer-dispersed liquid crystal layer 38 at the same time. This means that the laminate type polymer-dispersed liquid crystal display element shown in FIG. 2 can be driven at the same voltage as used for driving the display element having a single polymer-dispersed liquid crystal layer shown in FIG. 1. When the switch 24 is turned on to apply a voltage to the X electrodes 12, 36 and the Y electrodes 16, 32 from the AC power source 26, the liquid crystal molecules in the first and second liquid crystal layers are aligned mostly in the direction vertical to the electrode-constituting electro-conductive film surface, and when the switch 24 is off (i.e. when no voltage is applied to the electroconductive film surface), the liquid crystal molecules in the first and second liquid crystal layers 18 and 38 are aligned mostly in the direction non-vertical to the electroconductive film surface.

The laminate type polymer-dispersed liquid crystal display element 2 shown in FIG. 2 can be used either as a reflection type or as a transmission type display element like the single layer type polymer-dispersed liquid crystal display element 1 shown in FIG. 1. In case it is used as a reflection type display element, preferably an opaque substrate is used as the first substrate 10. In case the first substrate 10 is a transparent substrate, a reflector 30 is bonded to the other side of the first transparent substrate 10 as shown in FIG. 2. The reflector material suited for the above purpose is well known to the persons skilled in the art. In case this laminate type polymer-dispersed liquid crystal display element is used as a transmission type display element, a light source (not shown) is provided at the rear of the polymer-dispersed liquid crystal display element 1. The laminate type polymer-dispersed liquid crystal display element shown in FIG. 2, as compared with the single layer type shown in FIG. 1, is enhanced in light scattering strength when no electric field is applied, and also bettered in contrast. Further, since this laminate type liquid crystal display element can be operated at the same drive voltage as required for the single layer type, it is best suited as a display element for the open-air giant screens.

The polymer-dispersed liquid crystal composition of the present invention and the manufacture of the liquid crystal display elements using the composition will be described more particularly below with reference to the embodiments of the invention. In the following Examples and Comparative Examples, the shown values of dielectric constant ($\epsilon$) are the ones measured at 20° C. and 1 KHz. The dielectric constant parallel to long-axial of the liquid crystal is represented by $\epsilon\|$, and the dielectric constant perpendicular to long-axial of the liquid crystal is represented by $\epsilon\perp$.

EXAMPLE 1

The following materials were blended in the specified ratios, and the blend was stirred by a homogenizer at room temperature for 15 minutes to prepare a mixed solution of polymer-dispersed liquid crystal composition.

Polymer:
CR-M (a mixture of cyanoethylated pullulan and cyanoethylated polyvinyl alcohol; dielectric constant: 15) produced by Shin-Etsu Chemical Co., Ltd. 5 parts by weight
Liquid crystal:
cyanobiphenyl-based liquid crystal E-8 produced by MERCK Corp.(dielectric constant 9.5) 1 part by weight
Dichroic dye:
G-241 produced by Nippon Kanko Shikiso KK 0.02 part by weight Solvent:
acetone 95 parts by weight This mixed solution was coated on a PET film having formed thereon 7 ITO stripe patterns by an applicator to form a 5 μm thick film. Then the film substrates each having the above film formed thereon were placed one on another in the direction orthogonal to the stripes and heat-press bonded to each other to make a matrix type polymer-dispersed liquid crystal display element A.

EXAMPLE 2

The procedure of Example 1 was carried out except for use of the materials in the ratios shown below to make a matrix type polymer-dispersed liquid crystal display element B.

Polymer:
Shin-Etsu Chemical's CR-M (dielectric Constant: 15) 3 parts by weight
Liquid crystal:
MERCK's cyanobiphenyl-based E-8 (dielectric constant: 9.5) 1 part by weight
Dichroic dye:
Nippon Kanko Shikiso's G-241 0.02 part by weight
Solvent:
acetone 27 parts by weight

EXAMPLE 3

A matrix type polymer-dispersed liquid crystal display element C was made by following the same procedure as in Example 1 except that the following materials were used in the shown ratios, and that the average dielectric constant of the polymer was made 9.5 same as the liquid crystal.

Polymers:
Shin-Etsu Chemical's CR-M (dielectric Constant: 15) 2.5 parts by weight
Sekisui Chemical's S-LEC BMS (dielectric constant: 4) 2.5 parts by weight
Liquid crystal:
MERCK's cyanobiphenyl-based E-8 (dielectric constant: 9.5) 1 part by weight
Dichroic dye:
Nippon Kanko Shikiso's G-241 0.02 part by weight
Solvent:
acetone 95 parts by weight

COMPARATIVE EXAMPLE 1

A matrix type polymer-dispersed liquid crystal display element D was made by following the same procedure as in Example 1 except for use of the following composition.

Polymer:
Sekisui Chemical's S-LEC BMS 1 part by weight
Liquid crystal:
MERCK's cyanobiphenyl-based E-8 5 parts by weight
Dichroic dye:
Nippon Kanko Shikiso's G-241 0.1 part by weight
Solvent:
1/1 cyclohexanone/toluene mixed solution 9 parts by weight The four types of display element A, B, C and D obtained in the above Examples and Comparative Example were operated by applying 60 Hz sine wave to the central stripe of the upper and lower ITO stripe electrodes of each element, and survey was conducted to see whether cross-talk effect (CT) occurred or not. The results are summarized in Table 1.

TABLE 1

| Voltage (V) | Element A | Element B | Element C | Element D |
|---|---|---|---|---|
| 10 | No CT occurred | No CT occurred | No CT occurred (not lighted) | Weak CT occurred |
| 20 | No CT occurred | No Ct occurred | No CT occurred (lighted dimly) | Weak CT occurred |
| 30 | No CT occurred | Weak CT occurred | No CT occurred (lighted dimly) | CT occurred |
| 40 | Weak CT occurred | Weak CT occurred | Weak CT occurred (lighted) | CT occurred |
| 50 | Weak CT occurred | CT occurred | Weak CT occurred (lighted) | CT occurred |

As is seen from Table 1, a weak cross-talk effect occurred on application of a voltage of 10 V upwards in the comparative element D, while the occurrence of cross-talk effect lessened in the elements A, B and C of the present invention, particularly a remarkable decrease of cross-talk effect seen in the element A. Also, the elements A and B of the present invention could stand comparison with the comparative element D in on/off contrast, and it was confirmed that these elements were capable of distinct display even at a voltage of 20~30 V. It was further confirmed that the element A of the present invention was capable of alphabetical and numerical displays by 5×7 dots matrix drive. As for the element C of the present invention, although a similar improvement to the element A was seen on cross-talk effect, the drive voltage was rather high and clear display could not be made at a voltage below 40 V.

EXAMPLE 4

5 g of Shin-Etsu Chemical's polymer CR-M (a cyanoethylated pullulan/cyanoethylated polyvinyl alcohol mixture; $\epsilon$=15) was weighed out, and 20 g of acetone was added thereto as solvent to prepare a polymer solution. In 1 g of MERCK's cyanobiphenyl-based liquid crystal E-8 (nematic liquid crystal, $\epsilon\perp$=5.7; $\epsilon\|$=21.3), Mitsui Toatsu Fine Chemical's dichroic dye S-428 (black) was dissolved in an amount of 2% based on the weight of the liquid crystal. These materials were compounded and stirred by a homogenizer at room temperature for 15 minutes to prepare a polymer-dispersed liquid crystal mixed solution.

This mixed solution was coated on the third PET film substrate 34 having formed thereon the fourth ITO film 36 by an applicator and dried to form a 10 μm thick second polymer-dispersed liquid crystal layer 38. Then the polymer solution was coated on the third ITO film 32 on one side of the second PET film substrate 14 whose other side was coated with the second ITO film 16, thereby forming a 2 μm thick polymer monolayer 40. After this coating has been dried, the said mixed solution was coated on the second ITO film 16 on the opposite side of the substrate to form a 10 μm thick first polymer-dispersed liquid crystal layer 18. Finally, the polymer solution was coated on the first ITO film 12 formed on one side of the first PET film substrate 10 to form a 2 μm thick polymer monolayer 20.

The polymer monolayer 40 side of the second substrate 14 was disposed on the second polymer-dispersed liquid crystal layer 38 on the said third substrate 34, and the polymer monolayer 20 of the first substrate 1 was disposed on the first polymer-dispersed liquid crystal layer 18 side of the second substrate 14. In the above disposition, positioning was made so that the ITO patterns of the respective substrates would coincide with each other. The said substrates were heat-press bonded at 110° C. to make a polymer-dispersed liquid crystal display element of a laminated structure such as shown in FIG. 2.

EXAMPLE 5

20 g of acetone was added as solvent to 5 g of Shin-Etsu Chemical's polymer CR-M (a cyanoethylated pullulan/cyanoethylated polyvinyl alcohol mixture; $\epsilon$=15) to prepare a polymer solution. Also, in 1 g of MERCK's cyanobiphenyl-based liquid crystal E-8 (nematic liquid crystal, $\epsilon\perp$=5.7; $\epsilon\|$=21.3), Mitsui Toatsu Fine Chemical's dichroic dye E-8 (black) was dissolved in an amount of 2% based on the weight of the liquid crystal. These materials were compounded and stirred by a homogenizer at room temperature for 15 minutes to prepare a polymer-dispersed liquid crystal mixed solution.

This mixed solution was coated on the second PET film substrate 14 having formed thereon an ITO pattern 16 and dried to form a 10 μm thick first polymer-dispersed liquid crystal layer 18. Also, the polymer solution was coated on the first transparent electrode 12 on the first PET film substrate 10 to form a 2 μm thick polymer monolayer 20. The polymer-dispersed liquid crystal layer 18 on the second PET film substrate 14 was disposed vis-à-vis to the polymer layer on the first PET film substrate 10, with positioning being conducted so that the ITO patterns of the respective substrates would coincide with each other. The said substrates were heat-press bonded at 110° C. to make a polymer-dispersed liquid crystal display element F of a laminated structure such as shown in FIG. 1.

COMPARATIVE EXAMPLE 2

20 g of a 1/1 ethanol/toluene mixed solution was added to 2 g of Sekisui Chemical's polyvinyl butyral resin S-LEC BMS ($\epsilon$=4) to prepare a binder solution. Also, in 2 g of MERCK cyanobiphenyl-based liquid crystal E-8 ($\epsilon\perp$=5.7; $\epsilon\|$=21.3), Mitsui Toatsu Fine Chemical's dichroic dye S-428 (back) was dissolved in an amount of 2% based on the weight of the liquid crystal. These materials were compounded and stirred by a homogenizer at room temperature for 15 minutes to prepare a polymer-dispersed liquid crystal mixed solution.

This mixed solution was coated on the second PET film substrate 14 having formed thereon the ITO pattern 16 and dried to form a 10 μm thick first polymer-dispersed liquid crystal layer 18. The polymer-dispersed liquid crystal layer 18 on the second PET film substrate 14 was disposed vis-à-vis to the first ITO pattern 12 on the first PET film substrate 10 so that the ITO patterns of the respective substrates would coincide with each other, and the said substrates were heat-press bonded at 110° C. to make a polymer-dispersed liquid crystal display element G of a single layer structure.

Drive voltage and contrast of the liquid crystal display elements E, F and G obtained in Examples 4 and 5 and Comparative Example 2 were measured. Here, contrast is expressed by Tm/To where To (%) is transmittance when no voltage is applied and Tm (%) is transmittance maximized with application of voltage, and drive voltage is the voltage ($V_{90}$) at which transmittance Tm reaches 90%.

TABLE 2

|  | Drive voltage | Contrast |
|---|---|---|
| Element E | 25 | 20 |
| Element F | 25 | 7 |
| Element G | 45 | 5 |

Figure 3:
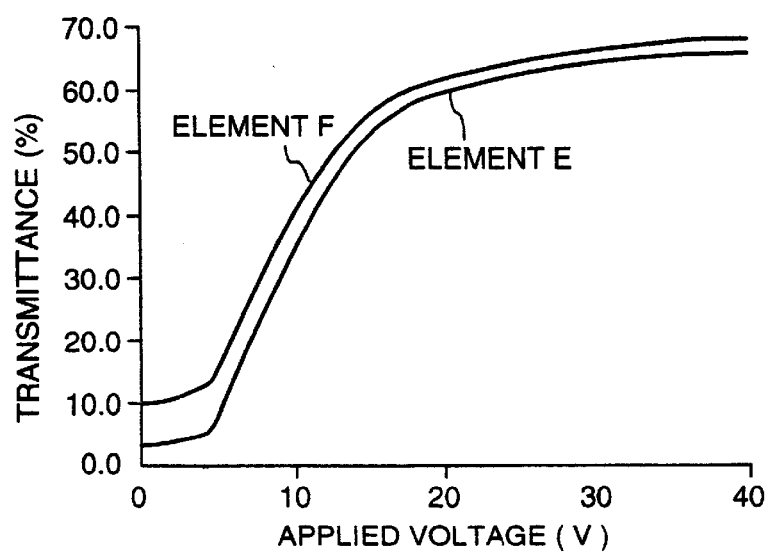
FIG. 3 is characteristic curves showing the relationship between applied voltage and transmittance of the laminate type liquid crystal display element obtained in Example 4 and the single layer type liquid crystal display element obtained in Example 5.

As is seen from Table 2, the element G was far higher than the elements E and F in drive voltage and lower in contrast. The element E having a two-layer laminated structure follows the substantially same pattern of change of transmittance with drive voltage as the element F of a single layer structure as shown in FIG. 3, and it was confirmed that the element E was improved in contrast over the element F of a single layer structure.

With the element F of a single layer structure, peel strength between the film substrates was measured by a T type peel test (crosshead speed: 50 mm/min) for both of the case where the polymer monolayer 20 was provided on the first transparent electrode 12 of the first PET film substrate 10 and the case where no polymer monolayer 20 was provided. Peel strength was 0.56 kg/25 mm in case the polymer monolayr 20 was provided and 0.012 kg/25 mm in case no polymer monolayer was provided. It was thus confirmed that adhesion between the substrates is obviously improved by providing the polymer monolayer 20. It appears that this adhesion improving effect would be even more intensified in the element E having a two-layer laminated structure.

As described above, it is possible according to the present invention to provide a polymer-dispersed liquid crystal display element which is free of cross-talk effect and capable of dot matrix display by incorporating a compositional feature that the volumetric content of the liquid crystal is made less than that of the polymer, and by using a polymer having a greater dielectric constant than the liquid crystal.

The laminate type polymer-dispersed liquid crystal display element shown in FIG. 2 is enhanced in light scattering strength in the absence of electric field and also improved in contrast in comparison with the single layer type polymer-dispersed liquid crystal display element shown in FIG. 1. Since this laminate type liquid crystal display element can be driven at the same voltage as required for the single layer type, it is best suited for use as a display element for open-air giant screens.

What is claimed is:

1. A polymer-dispersed liquid crystal composition comprising a blend of at least a polymer and liquid crystal, wherein the volumetric content of the liquid crystal is not greater than that of the polymer and the polymer comprises a cyanoethylated compound having a greater dielectric constant than that of the liquid crystal.

2. The polymer-dispersed liquid crystal composition according to claim 1, wherein the content of the polymer is in the range of 50 to 99 vol % and the content of the liquid crystal is in the range of 50 to 1 vol %.

3. The polymer-dispersed liquid crystal composition according to claim 2, wherein the content of the polymer is in the range of 70 to 95 vol % and the content of the liquid crystal is in the range of 30 to 5 vol %.

4. The polymer-dispersed liquid crystal composition according to claim 3, wherein the content of the polymer is 85 vol % and the content of the liquid crystal is 15 vol %.

5. The polymer-dispersed liquid crystal composition according to claim 1, further comprising a dichroic dye.

6. The polymer-dispersed liquid crystal composition according to claim 1, wherein the compound is at least one selected from the group consisting of cyanoethylated cellulose, cyanoethylated pullulan, cyanoethylated saccharose and cyanoethylated polyvinyl alcohol.

7. A liquid crystal display element capable of simple matrix drive, said display element comprising a transparent substrate having its inner side coated with a transparent electrode-constituting electroconductive film, a transparent or opaque substrate having its inner side coated with a transparent or opaque electrode-constituting electroconductive film, and a polymer-dispersed liquid crystal layer interposed between the electrode-constituting electroconductive film of the respective substrates, said liquid crystal being mostly aligned in the direction vertical to the electrode-constituting electroconductive film surface when a voltage is applied thereto, and being mostly aligned in the direction non-vertical to the electrode-constituting electroconductive film surface when no voltage is aplied thereto, said polymer comprises a cyanoethylated compound having a greater dielectric constant than that of the liquid crystal, wherein the volumetric content of the liquid crystal in the polymer dispersed liquid crystal layer is not greater than the volumetric content of the polymer.

8. The liquid crystal display element according to claim 7, wherein the content of the polymer in the polymer-dispersed liquid crystal layer is in the range of 50 to 99 vol % and the content of the liquid crystal is in the range of 50 to 1 vol %.

9. The liquid crystal display element according to claim 8, wherein the content of the polymer in the polymer-dispersed liquid crystal layer is in the range of 70 to 95 vol % and the content of the liquid crystal is in the range of 30 to 5 vol %.

10. The liquid crystal display element according to claim 9, wherein the content of the polymer is 85 vol % and the content of the liquid crystal is 15 vol %.

11. The liquid crystal display element according to claim 7, wherein the polymer-dispersed liquid crystal layer further contains a dichroic dye.

12. The liquid crystal display element according to claim 7, which is a matrix type element.

13. The liquid crystal display element according to claim 7, wherein the compound is at least one selected from the group consisting of cyanoethylated cellulose, cyanoethylated pullulan, cyanoethylated saccharose and cyanoethylated polyvinyl alcohol.

14. A liquid crystal display element comprising a first transparent or opaque substrate having on one side thereof a first transparent or opaque electroconductive film, a second transparent substrate having on one side thereof a second transparent electroconductive film and on the other side a third transparent electroconductive film, a third transparent substrate having on one side thereof a fourth transparent electroconductive film, a first polymer-dispersed liquid crystal layer interposed between said first transparent or opaque electroconductive film and said second transparent electroconductive film, and a second polymer-dispersed liquid crystal layer interposed between said third transparent electroconductive film and said fourth transparent electroconductive film, wherein said first transparent or opaque electroconductive film and said fourth transparent electroconductive film constitute a first electrode, and said second transparent electroconductive film and said third transparent electroconductive film constitute a second electrode, and further characterized in that the volumetric content of the liquid crystal in the polymer-dispersed liquid crystal layer is not greater than the volumetric content of the polymer, wherein the content of the polymer is 85 vol % and the content of the liquid crystal is 15 vol %.

15. A process for producing a liquid crystal display element comprising a first substrate having on one side thereof a first electroconductive film, a second substrate having on one side thereof a second electroconductive film, and a liquid crystal layer disposed between said first and second electroconductive films, the process comprising the steps of:

coating a polymer-dispersed liquid crystal composition on the first electroconductive film of the first substrate to form a polymer-dispersed liquid crystal layer;

coating a polymer solution on the second electroconductive film of the second substrate to form a polymer monolayer; and disposing the polymer-dispersed liquid crystal layer of the first substrate vis-à-vis the polymer monolayer of the second substrate, and bonding the first and second substrates to each other, wherein the content of the polymer in the polymer-dispersed liquid crystal composition is 85 vol % and the content of the liquid crystal is 15 vol %.

* * * * *